(12) United States Patent
Kim

(10) Patent No.: US 7,729,721 B2
(45) Date of Patent: Jun. 1, 2010

(54) ANTENNA INTEGRATED SPEAKER ASSEMBLY, MANUFACTURING METHOD THEREOF, AND WIRELESS COMMUNICATION DEVICE HAVING THE SAME

(75) Inventor: Hyun-Jun Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 879 days.

(21) Appl. No.: 11/521,450

(22) Filed: Sep. 15, 2006

(65) Prior Publication Data

US 2007/0066274 A1 Mar. 22, 2007

(30) Foreign Application Priority Data

Sep. 16, 2005 (KR) ...................... 10-2005-0087119
Sep. 16, 2005 (KR) ...................... 10-2005-0087120

(51) Int. Cl.
*H04M 1/00* (2006.01)
*H04B 1/08* (2006.01)

(52) U.S. Cl. .................. 455/550.1; 455/350; 455/575.7
(58) Field of Classification Search ............. 455/550.1, 455/557, 90.1, 90.3, 575.1, 575.3, 575.7, 455/350, 569.1, 562.1, 274, 347
See application file for complete search history.

(56) References Cited

U.S. PATENT DOCUMENTS 7,167,130 B2 * 1/2007 Hayes ........................ 343/702
7,376,447 B2 * 5/2008 Yoshida et al. ........... 455/569.1

* cited by examiner

*Primary Examiner*—Eugene Yun
(74) *Attorney, Agent, or Firm*—Birch, Stewart, Kolasch & Birch, LLP

(57) ABSTRACT

An antenna integrated speaker assembly, a manufacturing method thereof, and a wireless communication device having the same. The antenna integrated speaker assembly comprises a speaker unit for outputting sound corresponding to an electric signal of a controller; and an antenna unit formed at the speaker unit, for transceiving an electric signal by an interwork with the controller. Accordingly, an installation space for an antenna and a speaker is minimized.

15 Claims, 6 Drawing Sheets

ANTENNA INTEGRATED SPEAKER ASSEMBLY, MANUFACTURING METHOD THEREOF, AND WIRELESS COMMUNICATION DEVICE HAVING THE SAME

RELATED APPLICATIONS

The present disclosure relates to subject matter contained in priority Korean Applications No. 10-2005-0087119 and No. 10-2005-0087120 filed on Sep. 16, 2006, which are herein expressly incorporated by reference in its entirety.

BACKGROUND OF THE INVENTION

1. Field of the Invention

The present invention relates to an antenna integrated speaker assembly, and more particularly, to an antenna integrated speaker assembly capable of integrating an antenna for transceiving radio signals and a speaker for outputting sound, a manufacturing method thereof, and a wireless communication device having the same.

2. Description of the Background Art

Generally, a wireless communication device is provided with an antenna for receiving or transmitting radio signals. The wireless communication device is also provided with a speaker for outputting information received by the antenna.

The wireless communication device will be explained with reference to a mobile communication terminal of FIG. 1.

FIG. 1 is a perspective view showing a mobile communication terminal in accordance with the related art.

As shown in FIG. 1, the mobile communication terminal comprises a first body 10 and a second body 20 rotatably connected to the first body 10 via a hinge portion 30. For example, the mobile communication terminal is referred to as a folder type mobile communication terminal.

Key pads 11 for inputting information such as characters, numbers, etc. or a mike 13 for inputting sound are arranged at a front surface of the first body 10. A battery 15 is detachably mounted at a rear surface of the first body 10 thus to supply power to the body. A controller, e.g., a printed circuit board (PCB) is mounted in the first body 10 thus to electrically control each component of the body.

A display 21 for outputting visual information and a speaker 23 for outputting sound are mounted at a front surface of the second body 20.

A hinge portion 30 includes a first hinge housing 31 protruding from both sides of one edge of the first body 10, and a second hinge housing 33 protruding from the center of one edge of the second body 20. A hinge shaft (not shown) for relatively rotating the first hinge housing 31 and the second hinge housing 33 is arranged in the first housing 31 and the second housing 33.

The body is provided with an antenna 40 for transceiving radio signals 20 thus to exchange received radio signals with a base station.

An external antenna 41 protruding to outside of the first body 10 is generally used as the antenna 40. However, an internal antenna 43 received in the body is being used instead of the external antenna 41.

One mobile communication terminal is generally provided with one 25 antenna (41 or 43). However, a pair of antennas 41 and 43 may be mounted at one mobile communication terminal for a diversity method.

The diversity method is used to a digital multimedia broadcasting (DMB) service, etc., and serves to overcome a fading phenomenon by receiving several signals independently faded and then combining the signals to one another. In order to obtain independent radio signal paths more than two, said two antennas 41 and 43 are required.

Since the antenna and the speaker have to be installed at the wireless communication device, an installation space therefor more than a certain area is required in the wireless communication device. Furthermore, when the diversity method is applied to the wireless communication device, the installation space for the antenna and the speaker is more required due to a plurality of antennas.

An entire size of the wireless communication device has to be limited due to its portable characteristic.

Many efforts to decrease the size and the installation space for the is antenna and the speaker are being continuously performed so as to satisfy the function and the portability of the wireless communication device. However, the efforts have a limitation in that the size itself of the antenna and the speaker is decreased.

SUMMARY OF THE INVENTION

One aspect of the present invention is that the present inventor recognized certain problems of the related art. Based upon this recognition, the features of the present invention have been developed. The present invention provides an antenna integrated speaker assembly capable of decreasing an installation space of an antenna and a speaker by integrating the antenna and the speaker, and a manufacturing method thereof.

In the specification of the present invention, the wireless communication device will be explained with taking an example of a mobile communication terminal. However, the wireless communication device is not limited to the mobile communication terminal. The wireless communication device can be applied to any electronic device having a speaker and an antenna, e.g., a personal digital assistants (PDA), an MP3 player, a portable multimedia player (PMP), etc.

The foregoing and other aspects of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, an antenna integrated speaker assembly, a manufacturing method thereof, and a wireless communication device having the same will be explained with reference to the attached drawings.

Figure 2:
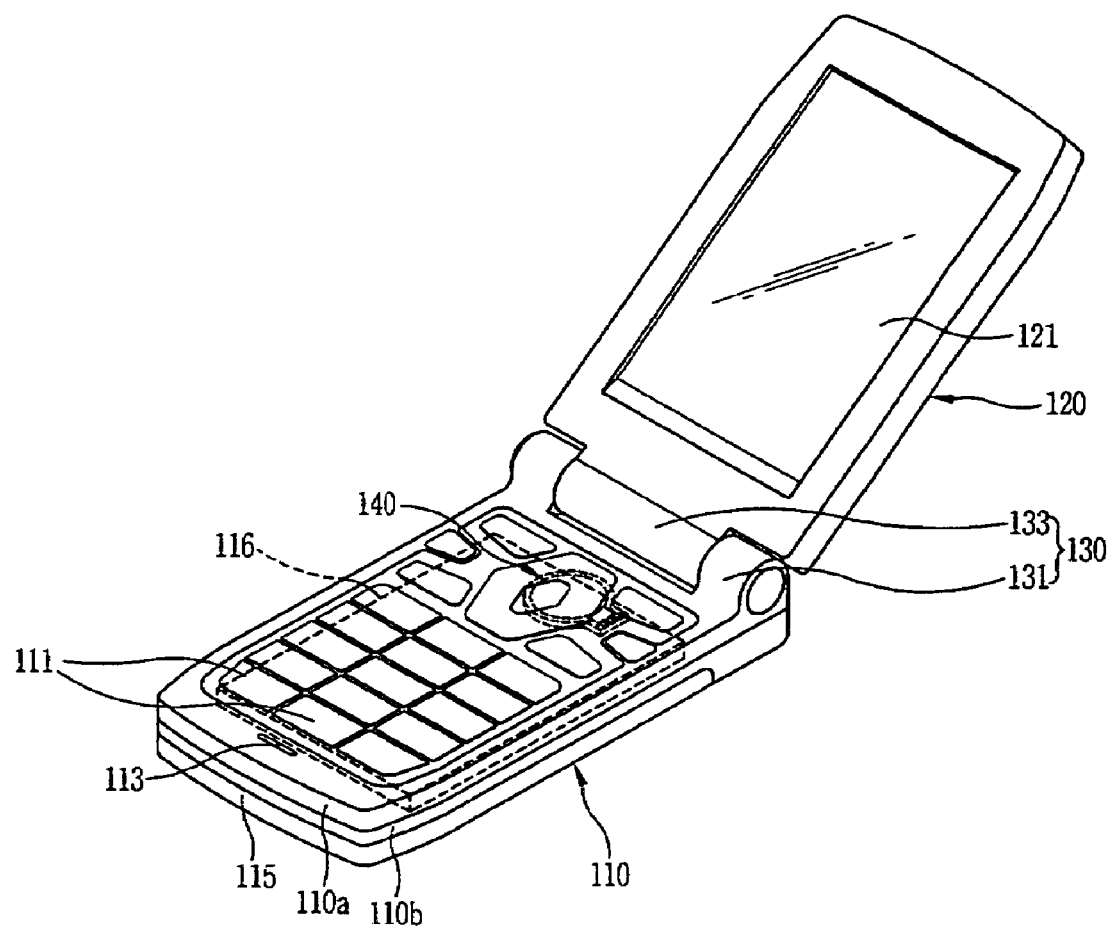
FIG. 2 is a perspective view showing a mobile communication terminal having an antenna integrated speaker assembly according to a first embodiment of the present invention.

FIG. 2 is a perspective view showing a mobile communication terminal having an antenna integrated speaker assembly according to a first embodiment of the present invention.

Referring to FIG. 2, the mobile communication terminal comprises first and second bodies 110 and 120, a controller 116, and an antenna integrated speaker assembly 140.

An embodiment of the present invention can be directed to a folder type mobile communication terminal, in which the first body 110 and the second body 120 are rotatably connected to each other by a hinge portion 130. The mobile communication terminal can be applied not only to a folder type but also to a bar type, a slide type, and swivel type, etc.

An input unit 111 for inputting each kind of information by a user's adjustment and a microphone (or mike) 113 for inputting sound are arranged at a front surface of the first body 110 (an upper case 110a). The input unit 111 is implemented as key pads. However, the input unit 111 can be implemented as other manner (e.g., a touch sensitive input). A battery 115 is detachably mounted at a rear surface of the first body 110 (a lower case 110b) thus to supply power to the body. A display unit 121 such as a liquid crystal display (LCD) for outputting visual information is mounted at one surface of the second body 120. The hinge portion 130 comprises a first hinge housing 131 and a second hinge housing 133 respectively protruding from facing edges of the first body 110 and the second body 120, and a hinge shaft (not shown) penetrating the first housing 131 and the second housing 133. Accordingly, the first body 110 and the second body 120 can perform a relative rotation with respect to each other.

The controller 116 is mounted in the first body 110 as a printed circuit board (PCB). The controller 116 controls each component of the first body 110 and the second body 120 by receiving signals from the input unit 111, the mike 113, etc. and then outputting the signals on the display unit 121, etc.

The antenna integrated speaker assembly 140 is mounted in the first body 110 thus to perform both an antenna function and a speaker function. The antenna integrated speaker assembly 140 can be protruding to outside of the first body 110 or made to be flush thereof.

Figure 3:
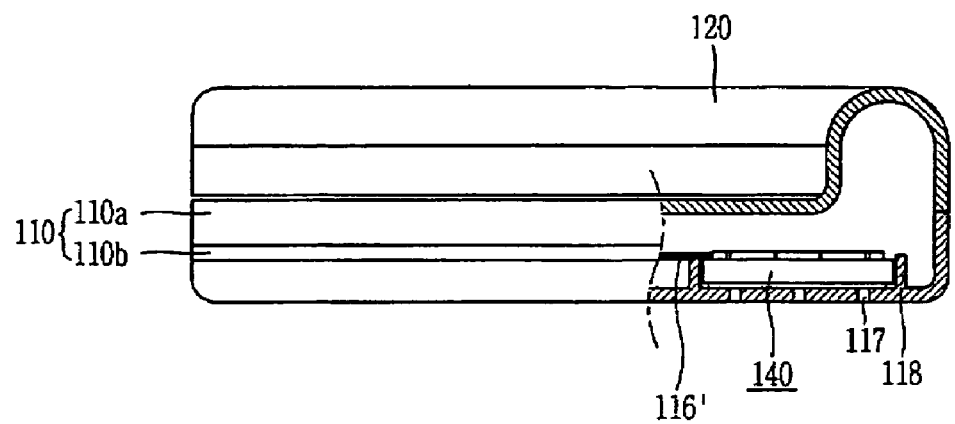
FIG. 3 is a sectional view showing a state that an antenna integrated speaker assembly is mounted in a mobile communication terminal according to the present invention.

FIG. 3 is a sectional view showing a state that an antenna integrated speaker assembly is mounted in a mobile communication terminal according to the present invention.

Referring to FIG. 3, a sound hole (or through hole) 117 is formed at the lower case 110b of the first body 110. The antenna integrated speaker assembly 140 is arranged so that sound can be outputted through the sound hole 117. A supporting portion 118 protruding from the lower case 110b supports a mounted state of the antenna integrated speaker assembly 140. The antenna integrated speaker assembly 140 is electrically connected to the controller 116 of FIG. 2 by a connection line 116.

A speaker and an antenna may be mounted at only one of the first body 110 and the second body 120, or two antenna integrated speaker assemblies 140 can be arranged at both the first body 110 and the second body 120 to provide the diversity method for antenna to overcome a fading phenomenon by receiving several signals independently faded and then combining the signals to one is another. Otherwise, either the first body 110 or the second body 120 where the speaker and the antenna are not mounted can be utilized for other purpose.

Figure 1:
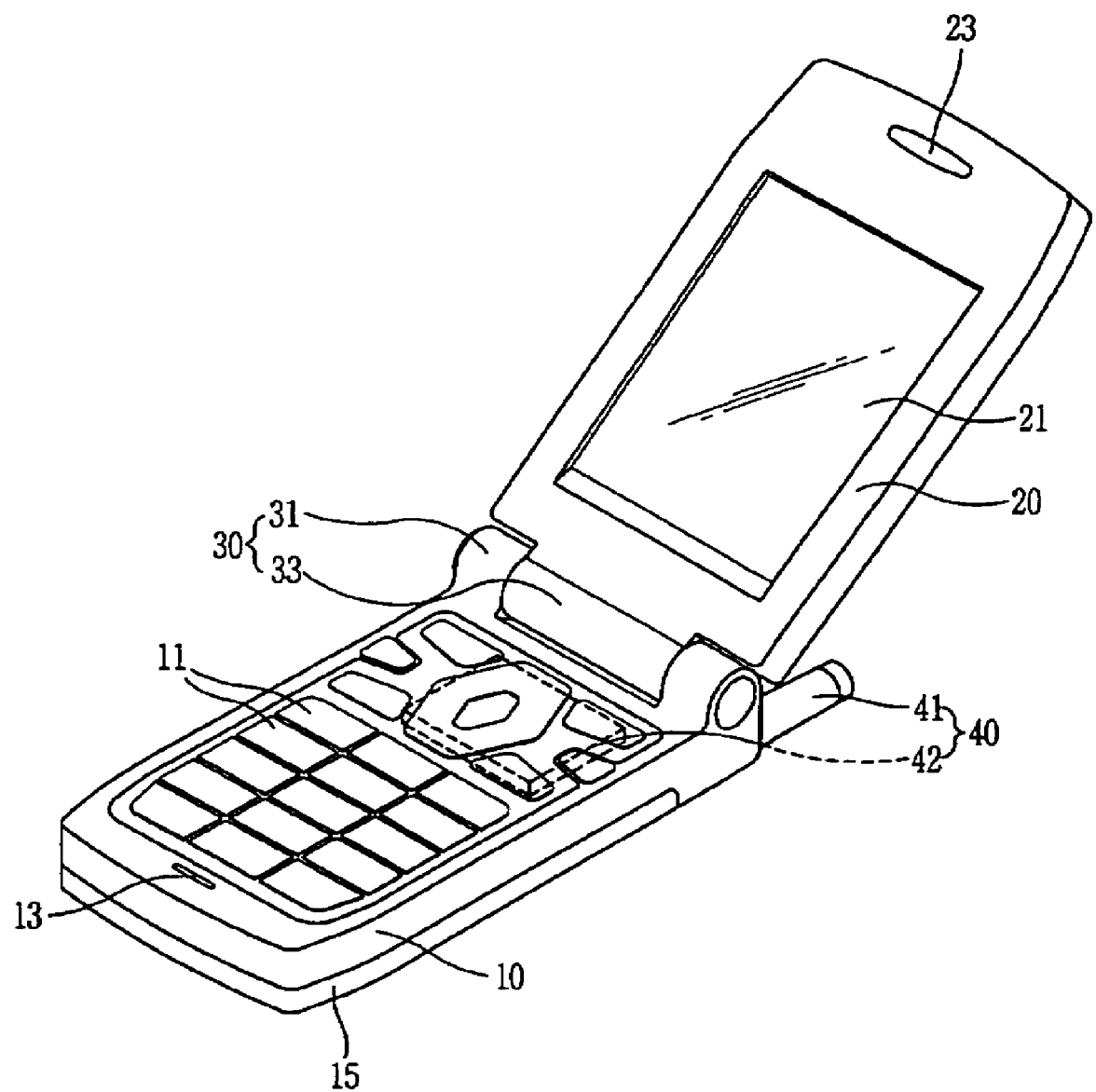
FIG. 1 is a perspective view showing a mobile communication terminal in accordance with the related art.

When the antenna integrated speaker assembly 140 is used to replace the conventional speaker 23 of FIG. 1, the antenna integrated speaker assembly 140 can be used for not only a general voice call, but also as a speaker phone to use the mobile terminal in a noisy environment or a loud speaker to play ring tones or MP3 music.

Because the antenna integrated speaker assembly 140 may reduce the initially required space for both antenna and speaker, each size of the first body 110 and the second body 120 can be more decreased. That is, the size of the second body 120 of FIG. 2 can be made to be smaller than that of the second body 20 of FIG. 1. As the speaker and the antenna can be integrated with each other, a spatial utilization degree and a design freedom degree of the mobile communication terminal are enhanced.

A construction of the antenna integrated speaker assembly 140 will be explained with reference to FIG. 4.

Figure 4:
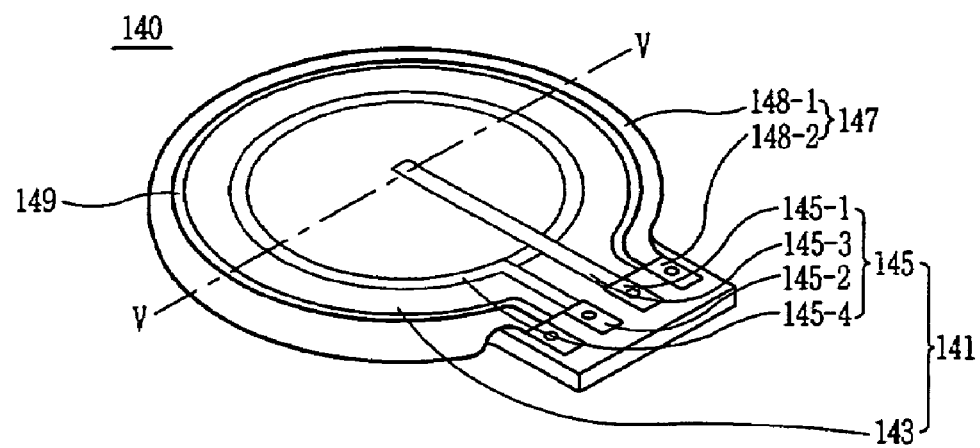
FIG. 4 is an enlarged perspective view showing an antenna integrated speaker assembly according to a first embodiment of the present invention.
Figure 5:
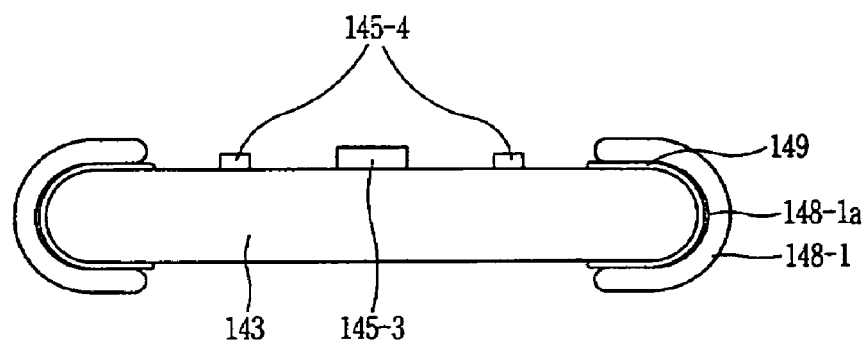
FIG. 5 is a sectional view taken along line V-V of FIG. 4.

FIG. 4 is an enlarged perspective view showing an antenna integrated speaker assembly according to a first embodiment of the present invention, and FIG. 5 is a sectional view taken along line V-V of FIG. 4.

An antenna integrated speaker assembly 140 according to a first embodiment of the present invention can comprise a speaker unit 141 and an antenna unit 147. That is, the speaker unit 141 for outputting sound and the antenna unit 147 for receiving and transmitting radio signals are integrally formed.

The speaker unit 141 may consist of a vibration plate (or membrane, diaphragm, etc) 143 and a speaker feeding portion (or speaker signal feeding connector) 145. The vibration plate 143 is implemented as a piezo-electric device thus to be vibrated by an electric signal inputted through the speaker feeding portion 145 and to generate sound. As shown in FIG. 4, the vibration plate 143 can be shaped in a circular disc, but it can be further configured to form other various shapes, such as a rectangular shape to accommodate the shape of a sidewall of the first body 110 or second body 120 so that the antenna integrated speaker unit 140 can be arranged at the sidewall of the first or second body (not shown), or a rectangular ring type to encircling the display unit 121 of the second body 120 to further save the space for the second body 120. Any other various shapes for the vibration plate 143 can be contemplated, as understood by one skilled in the art.

The speaker feeding portion 145 consists of a pair of terminal portions 145-1 and 145-2 and a pair of apply portions (or electrode) 145-3 and 145-4. When a first signal is applied to the vibration plate 143 through the terminal portion 145-1 and the apply portion 145-3 connected to each other, a second signal is 5 applied to the vibration plate 143 through the terminal portion 145-2 and the apply portion 145-4 connected to each other. The first signal and the second signal can have a phase difference of 180°.

The antenna unit 147 consists of an antenna portion 148-1 coupled to the vibration plate 143 and covering the vibration plate 143, and an antenna feeding portion 148-2 for electrically connecting the antenna portion 148-1 and the controller 116 of FIG. 2 to each other.

The antenna portion 148-1 is a conductor (or conductive member) or a conductive pattern formed by depositing a conductive material on a non-conductor.

The apply portion 1454 of the speaker unit 141 is spaced from the is antenna portion 148-1 of the antenna unit 147 so as not to be electrically influential on or interfering each other. When the apply portion 1454 and the antenna portion 148-1 may be arranged to be close to each other, an insulation member (or shield) 149 has to be additionally provided therebetween. More concretely, the insulation member 149 can be provided between an outer circumference of the vibration plate 143 and a receiving groove 148-1*a* of the antenna portion 148-1 for receiving the vibration plate 143.

Each operation of the antenna integrated speaker assembly 140 according to the first embodiment of the present invention and a mobile communication terminal having the same will be explained with reference to FIGS. 2 to 5.

First, a speaker function will be explained. When a user operates the input unit 111, the controller 116 applies electric signals for outputting specific sounds to the speaker feeding portion 145 of the speaker unit 141. Then, the vibration plate 143 implemented as a piezoelectric device receives the electric signal from the speaker feeding portion 145 thus to be vibrated. Accordingly, specific sound is generated, and the sound is outwardly outputted through the sound hole (or through hole) 117 formed at the first body 110.

Second, an antenna function will be explained. An electric signal for wireless communication provided by the controller 116 is applied to the antenna portion 148-1 through the antenna feeding portion (or antenna signal connector, terminal, etc.) 148-2. The electric signal is converted into an electromagnetic wave through a resonance thus to be transmitted to the air. A process for receiving the electric signal is performed in a reverse manner to the aforementioned process for transmitting the electric signal.

Figure 6:
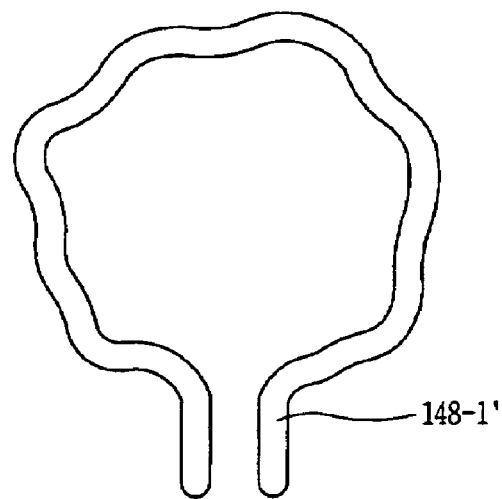
FIG. 6 is a conceptual view showing an antenna portion of FIG. 4 according to another embodiment of the present invention.

FIG. 6 is a conceptual view showing an antenna portion of FIG. 4 according to another embodiment of the antenna portion or unit of the present invention.

Referring to FIG. 6, a shape of an antenna portion 148-1' is not limited to the circular shape of the antenna portion 148-1 of FIG. 4. A length of the antenna portion 148-1' sometimes need to be increased according to a wavelength of a frequency bandwidth to be transceived from or to the antenna portion 148-1'. In that case, a radius of the antenna portion 148-1' is not increased but a shape of the antenna portion 148-1' is wrinkled (or pleated shape) thus to increase a conductive path (i.e., improve signal transmission and reception).

Figure 7:
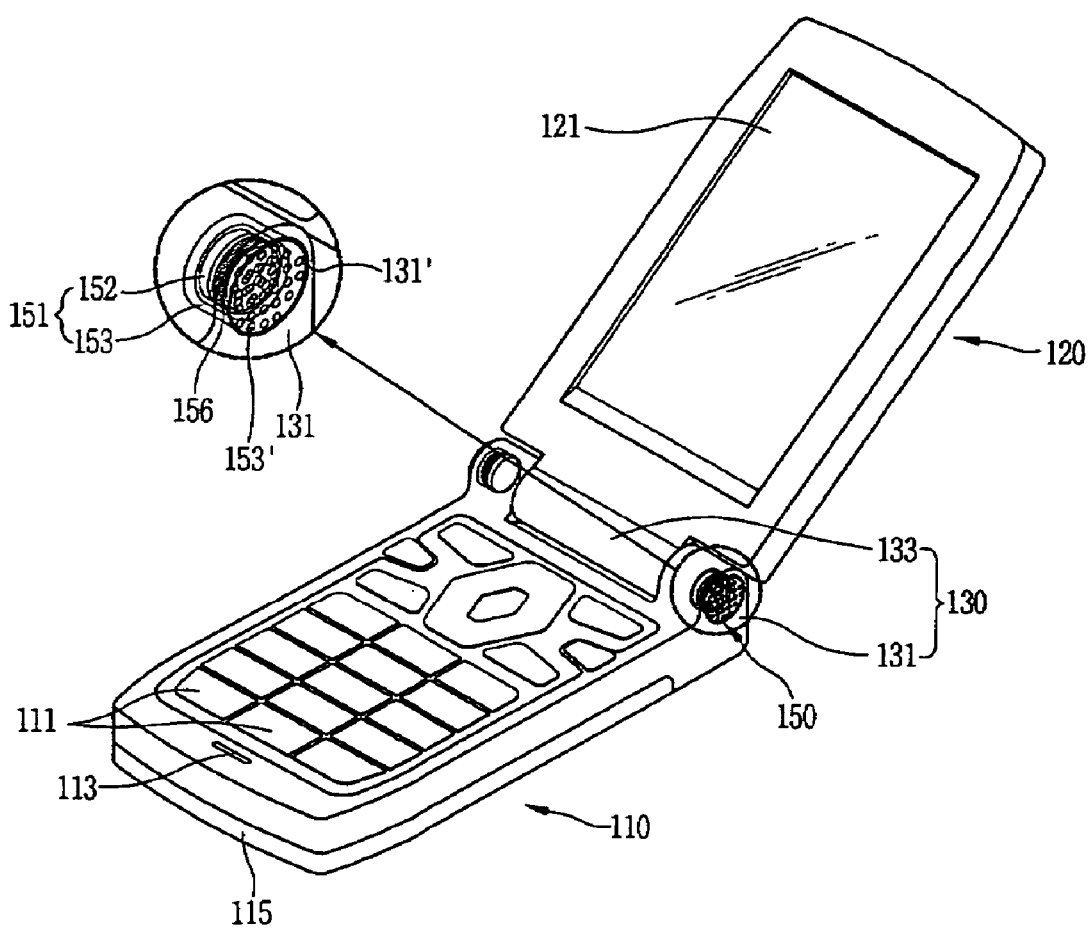
FIG. 7 is a perspective view showing a mobile communication terminal having an antenna integrated speaker assembly according to a second embodiment of the present invention.
Figure 8:
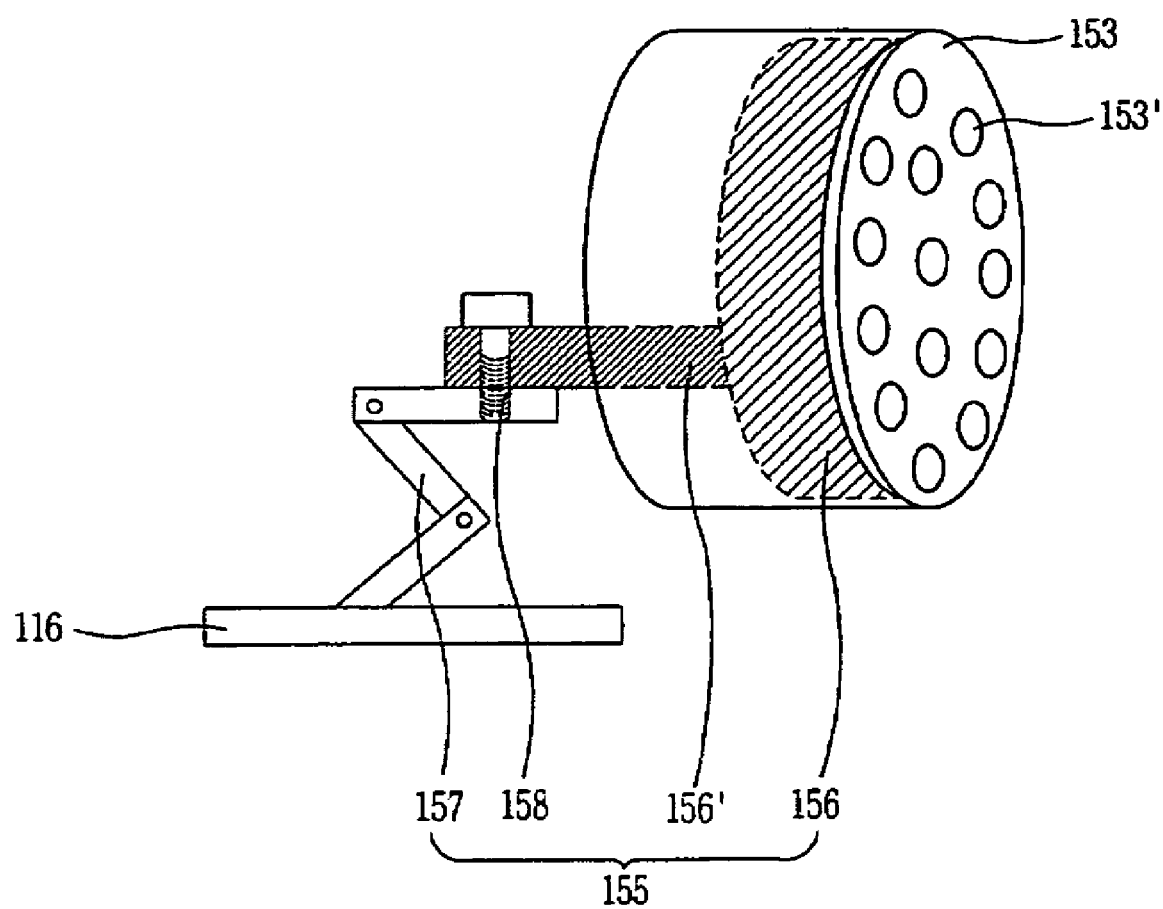
FIG. 8 is a conceptual view showing an antenna feeding portion of an antenna unit of FIG. 7.

FIG. 7 is a perspective view showing a mobile communication terminal having an antenna integrated speaker assembly according to a second embodiment of the present invention, and FIG. 8 is a conceptual view showing an antenna feeding portion of an antenna unit of FIG. 7. The same reference numerals are provided to the same parts as those of the aforementioned mobile 5 communication terminal, and their detailed explanation will be omitted.

An antenna integrated speaker assembly 150 according to a second embodiment of the present invention comprises a speaker unit 151 and an antenna unit 155.

The speaker unit 151 comprises a speaker module 152 electrically 10 connected to the controller 116 of FIG. 2 for generating sound, and a speaker case 153 covering the speaker module 152 for outputting sound outwardly. The speaker module 152 generates sound by receiving an electric signal, and includes not only the aforementioned piezo-electric speaker module but also any type such as a speaker module using a magnetic force (or electromagnet). The speaker case 153 is provided with a sound hole (or through hole) 153 through which sound generated from the speaker module 152 is outwardly emitted.

The antenna unit 155 comprises an antenna portion 156 formed at the speaker case 153, and an antenna feeding portion for electrically connecting the antenna portion 156 to the controller 116. The antenna portion 156 is a conductive 20 pattern formed by depositing a conductive material on one surface of the speaker case 153. The antenna feeding portion comprises an antenna terminal 156 extending from the antenna portion 156, and a connection terminal 157 for electrically connecting the antenna terminal 156 and the controller 116 to each other. As a coupling means for connecting the antenna terminal 156 to the 25 connection terminal 157, a screw 158, can be used, for example. Other type of fastening means can be used instead of the screw, as understood by the one skilled in the art.

An operation of the antenna integrated speaker assembly 150 according to the second embodiment is similar to that of the antenna integrated speaker assembly according to the first embodiment, and thus its detailed explanation will be omitted.

Referring to FIG. 7, the antenna integrated speaker assembly 150 according to the second embodiment is mounted at each receiving space 131 formed at both ends of the hinge portion 130. Accordingly, the rest space of the hinge portion 130 can be utilized effectively, and thus the rest space of the first body 110 and the second body 120 can be utilized more effectively.

Furthermore, a diversity method can be implemented in the antenna integrated speaker assemblies 150 provided as one pair in the present invention. The diversity method can be applied by providing a pair of the antenna integrated speaker assemblies 140 of the first embodiment, or by providing the antenna integrated speaker assembly 150 of the second embodiment together with the antenna integrated speaker assembly 140 of the first embodiment.

The present invention provides a mobile terminal comprising: a display unit for display visual information; an input unit to allow a user to input information; a microphone unit to receive sounds; a transceiver module to receive and transmit radio signals; an antenna integrated speaker assembly including a speaker unit and an antenna unit attached to at least a portion of a periphery of the speaker unit; and a controller cooperating with the display unit, the input unit, the microphone unit, the transceiver module, and the antenna integrated speaker assembly, wherein the controller is adapted to apply electric signals to the speaker unit for outputting sounds and to control the transceiver module with the antenna unit to receive and transmit the radio signals.

The speaker unit may comprise either a piezoelectric transducer or an electromagnet. The speaker unit can comprises: a membrane; at least one electrode attached to a surface of the membrane; and at least one speaker signal feeding connector adapted to be connected to the at least one electrode for receiving electric signals from the controller, wherein the membrane is adapted to be vibrated by the at least one electrode when the electric signals are received from the controller via the at least one speaker signal feeding connector.

Also the present invention can provide that the at least one electrode is adapted to be adequately distanced from the antenna unit to minimize electrical interference therebetween. The antenna unit can comprise: an antenna portion adapted to be shaped to partially match a periphery portion of the membrane; an antenna signal feeding connector for electrically connecting the antenna portion and the controller, wherein the antenna unit is adapted to be adequately distanced from the speaker unit to minimize an electrical interference therebetween.

The antenna unit may comprise a conductive member at least partially surrounding an outer circumference of the membrane. Also the mobile terminal can further comprise: a body in which the display unit, the input unit, the microphone unit, the transceiver module, the transceiver, the antenna integrated speaker assembly and controller are located, wherein the antenna integrated speaker assembly is adapted to be located inside the body and to output sounds through a through hole of the body to perform a speaker phone function.

The antenna integrated speaker assembly may further comprise a speaker case having a through hole and adapted to cover the antenna integrated speaker assembly.

The antenna unit can comprise a conductive member adapted to be shaped to at least partially match a periphery of the speaker case and attached to one surface of the speaker case. Also, the antenna unit may have a pleated shape to improve signal transmission and reception.

The mobile terminal can further comprise: a first body; a second body moveable with respect to the first body; and a hinge portion for rotatably connecting the first body and the second body, wherein the antenna integrated speaker assembly is provided at least one of both ends of the hinge portion. The antenna integrated speaker assembly may be adapted to be provided at both ends of the hinge portion to provide a diversity antenna function. The antenna integrated speaker assembly can further comprise a shield disposed between the speaker unit and the antenna unit.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An antenna integrated speaker assembly, comprising:
   a speaker unit configured to output sound corresponding to signals from a controller; and
   an antenna unit formed at the speaker unit, configured to transmit and receive radio signals by cooperating with the controller,
   wherein the speaker unit comprises:
      a vibration plate serving as a piezo-electric device; and
      a speaker feeding portion configured to electrically connect the vibration plate and the controller to each other, and to apply an electric signal from the controller to the vibration plate, and
   wherein the antenna unit comprises:
      an antenna portion coupled to the vibration plate and configured to hold an outer circumference of the vibration plate, wherein the vibration plate is supported by the holding of antenna portion at the time of a vibration occurrence; and
      an antenna feeding portion configured to electrically connect the antenna portion and the controller to each other.

2. The antenna integrated speaker assembly of claim 1, wherein the speaker feeding portion comprises:
   a pair of terminal portions configured to receive first and second electric signals; and
   a pair of apply portions configured to electrically connect each of the pair of terminal portions to the controller, and to apply the first and second electric signals from the terminal portions to the vibration plate.

3. The antenna integrated speaker assembly of claim 2, wherein the pair of apply portions are arranged to be spaced from the antenna portion.

4. The antenna integrated speaker assembly of claim 2, further comprising an insulation member arranged between the antenna portion and one of the pair of apply portions adjacent to the antenna portion, for insulating therebetween.

5. The antenna integrated speaker assembly of claim 1, wherein the antenna portion is a conductor or a conductive pattern formed by depositing a conductive material on a non-conductor.

6. The antenna integrated speaker assembly of claim 5, wherein the conductor or the conductive pattern has a rounded shape.

7. The antenna integrated speaker assembly of claim 1, further comprising:
   a receiving groove formed at the antenna portion and configured to receive the outer circumference of the vibration plate.

8. A wireless communication device, comprising:
   a body;
   a controller mounted at the body and configured to control the wireless communication device; and
   an antenna integrated speaker assembly mounted at the body and electrically connected to the controller, the antenna integrated speaker assembly comprising:
      a speaker unit configured to output sound corresponding to an electric signal of the controller; and
      an antenna unit formed at the speaker unit and configured to transmit and receive radio signals by cooperating with the controller,
   wherein the speaker unit comprises:
      a vibration plate serving as a piezo-electric device; and
      a speaker feeding portion configured to electrically connect the vibration plate and the controller to each other, and to apply an electric signal from the controller to the vibration plate, and
   wherein the antenna unit comprises:
      an antenna portion coupled to the vibration plate and configured to hold an outer circumference of the vibration plate, wherein the vibration plate is supported by the holding of antenna portion at the time of a vibration occurrence; and
      an antenna feeding portion configured to electrically connect the antenna portion and the controller to each other.

9. The wireless communication device of claim 8, wherein a plurality of antenna integrated speaker assemblies are provided at the body.

10. The wireless communication device of claim 8, wherein the body comprises:
    a first and second body; and
    a hinge portion configured to rotatably connect the first body and the second body to each other, and
    wherein the antenna integrated speaker assembly is provided at both ends of the hinge portion as one pair.

11. The wireless communication device of claim 8, wherein the body comprises:
    an input unit configured to receive information by a user's input; and
    a display unit configured to output visual information by the controller.

12. The wireless communication device of claim 8, further comprising:

a receiving groove formed at the antenna portion and configured to receive the outer circumference of the vibration plate.

13. A method for manufacturing an antenna integrated speaker assembly, comprising:

providing a speaker unit including a vibration plate serving as a piezo-electric device;

forming an antenna portion at the speaker unit and coupling the antenna portion to the vibration plate to hold an outer circumference of the vibration plate so as to support the vibration plate at the time of a vibration occurrence; and forming an antenna feeding portion at the antenna portion, the antenna feeding portion electrically connected to a controller.

14. The method of claim 13, wherein a conductive material is deposited on the speaker unit when forming the antenna portion.

15. The method of claim 13, further comprising an insulating device disposed between the speaker unit and the antenna portion.

* * * * *